(12) United States Patent
Rajaraman

(10) Patent No.: US 6,591,757 B1
(45) Date of Patent: Jul. 15, 2003

(54) MOTOR DRIVEN HIGH STABILITY BRAKE FOR LINEAR MOTION SYSTEMS

(75) Inventor: Devarajan Rajaraman, Melville, NY (US)

(73) Assignee: Anorad Corporation, Hauppauge, NY (US)

( * ) Notice: Subject to any disclaimer, the term of this patent is extended or adjusted under 35 U.S.C. 154(b) by 0 days.

(21) Appl. No.: 10/035,950

(22) Filed: Dec. 26, 2001

(51) Int. Cl.[7] .................................................. B60L 13/00
(52) U.S. Cl. ..................................................... 104/290
(58) Field of Search ............................. 104/290, 292, 104/250, 252; 188/64, 67, 267

(56) References Cited

U.S. PATENT DOCUMENTS

| | | | | |
|---|---|---|---|---|
| 3,680,489 A | * | 8/1972 | English ...................... 104/291 |
| 3,709,383 A | * | 1/1973 | Jennings et al. ............. 104/290 |
| 4,812,725 A | * | 3/1989 | Chitayat ..................... 318/625 |
| 4,819,564 A | * | 4/1989 | Brandis et al. .............. 104/292 |
| 4,860,662 A | * | 8/1989 | Matsumoto et al. ........ 104/290 |
| 5,469,775 A | * | 11/1995 | Stoll et al. ...................... 92/88 |
| 5,551,350 A | * | 9/1996 | Yamada et al. ............. 104/293 |
| 5,662,568 A | * | 9/1997 | Lindem ......................... 483/30 |
| 5,933,933 A | * | 8/1999 | Fritz et al. ................... 29/33 P |
| 6,009,981 A | | 1/2000 | Wolfe .......................... 188/267 |
| 6,016,607 A | | 1/2000 | Morimoto et al. ........... 33/1 M |
| 6,135,029 A | * | 10/2000 | Oberjohn ..................... 104/290 |
| 6,255,796 B1 | | 7/2001 | Ebihara et al. ............. 318/649 |

* cited by examiner

Primary Examiner—S. Joseph Morano
Assistant Examiner—Lars A. Olson
(74) Attorney, Agent, or Firm—Amin & Turocy; John M. Miller; Alexander M. Gerasimow

(57) ABSTRACT

The present invention relates to a stability brake for absorbing parasitic vibrations of a stage moved to a working position in a motion system. The stability brake includes a motor coupled to a flexure plate through a translation system. The translation system translates horizontal motion of the motor into vertical motion of the flexure plate. The stability brake can be mounted to a stage in a motion system, such as a linear motion system. The stability brake is operative to absorb jitters and vibrations of the stage when the stage is moved to a working position in a motion system and held under servo at the working position.

27 Claims, 7 Drawing Sheets

MOTOR DRIVEN HIGH STABILITY BRAKE FOR LINEAR MOTION SYSTEMS

TECHNICAL FIELD

The present invention generally relates to motion systems and in particular to a system and method for stabilizing a stage of a linear motion system during high precision positioning.

BACKGROUND OF THE INVENTION

Typically, linear motion systems comprise one or more tracks or guide rails on which a stage or carriage is moved. The movement can be accomplished by mechanical, electrical or pneumatic means. The linear motion systems have gained popularity in the machine tool, semiconductor and medical industries due to the ability of the linear motion system to move loads in a linear direction to a position with extreme accuracy and at very high speed. However, problems arise with moving a stage to a specific position with high precision, while holding the position of the stage so that forces acting on the carriage will not move the carriage from the desired position. A locking system such as a brake is conventionally employed to hold the position of the stage, but conventional brake devices do not provide stability without high distortion for very high precision motion, such as that necessary in the semiconductor industry.

The linear motion system is subjected to noise during normal operation. The noise can be electrical noise, ambient noise, ground noise, transmitted noises from the linear motion systems and other noise that cause small amounts of jittering or jumping in the stage when the stage is stopped and held in a desired position. These types of jittering and jumping cannot be measured or compensated for utilizing typical feedback elements of the stage. Furthermore, when a linear motor is utilized to move the stage, the stage is subjected to a load from the driving of the servo motor or the like. The loaded stage also contributes to the jittering or jumping of the stage when the stage is held in a desired position. A conventional brake system includes an actuator coupled to a spring using a fulcrum and lever. However, this type of conventional brake system cannot control the amount of jump or jitter of the stage.

Accordingly, it is desirable to provide a system and/or method that can provide high precision motion with high stability.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a stability brake for a motion system and a method of producing and using a stability brake. The stability brake includes a motor coupled to a flexure plate through a translation system. The translation system translates horizontal motion of the motor into vertical motion. The translation system translates vertical motion into a multiple of the horizontal motion. Therefore, a large vertical movement of the flexure plate can be provided by small horizontal movement of the motor, such that a translation gain results. The stability brake can be mounted to a stage in a motion system, such as a linear motion system. The stability brake is operative to absorb jitters and vibrations of the stage when the stage is moved to a working position in a motion system and held under servo at the working position.

In one aspect of the invention, the translation system is comprised of a first wedge portion and a second wedge portion. The first wedge portion is coupled to a motor through a movable strip, while the second wedge portion is coupled to a flexure plate. Horizontal movement of the movable strip by the motor causes horizontal movement of the first wedge portion which is translated into vertical movement of the second wedge portion and the flexure plate. The angles of the first and second wedge portions can be selected to provide different translation ratios (e.g., 10:1, 5:1, 3:1, 2:1), such that movement of the motor translates to movement of the flexure plate that is a multiple of the movement of the motor. The flexure plate absorbs jittering, vibration and other parasitic motions of the stage under servo.

The following description and the annexed drawings set forth in detail certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention will be described with reference to stability brake for a motion system and a method of producing and using the same. The stability brake includes a motor coupled to a flexure plate through a translation system. The translation system translates horizontal motion of the motor into vertical motion of the flexure plate. The translation system also translates the vertical motion into a multiple of the horizontal motion. That is large vertical movement is provided by small horizontal movement of the motor, such that a translation gain (e.g., 10:1, 5:1, 2:1) is provided. The stability brake can be mounted to a stage in a motion system, such as a linear motion system. The stability brake is operative to absorb jitters and vibrations of the stage when the stage is moved to a working position in a motion system and held under servo at the working position.

Figure 1:
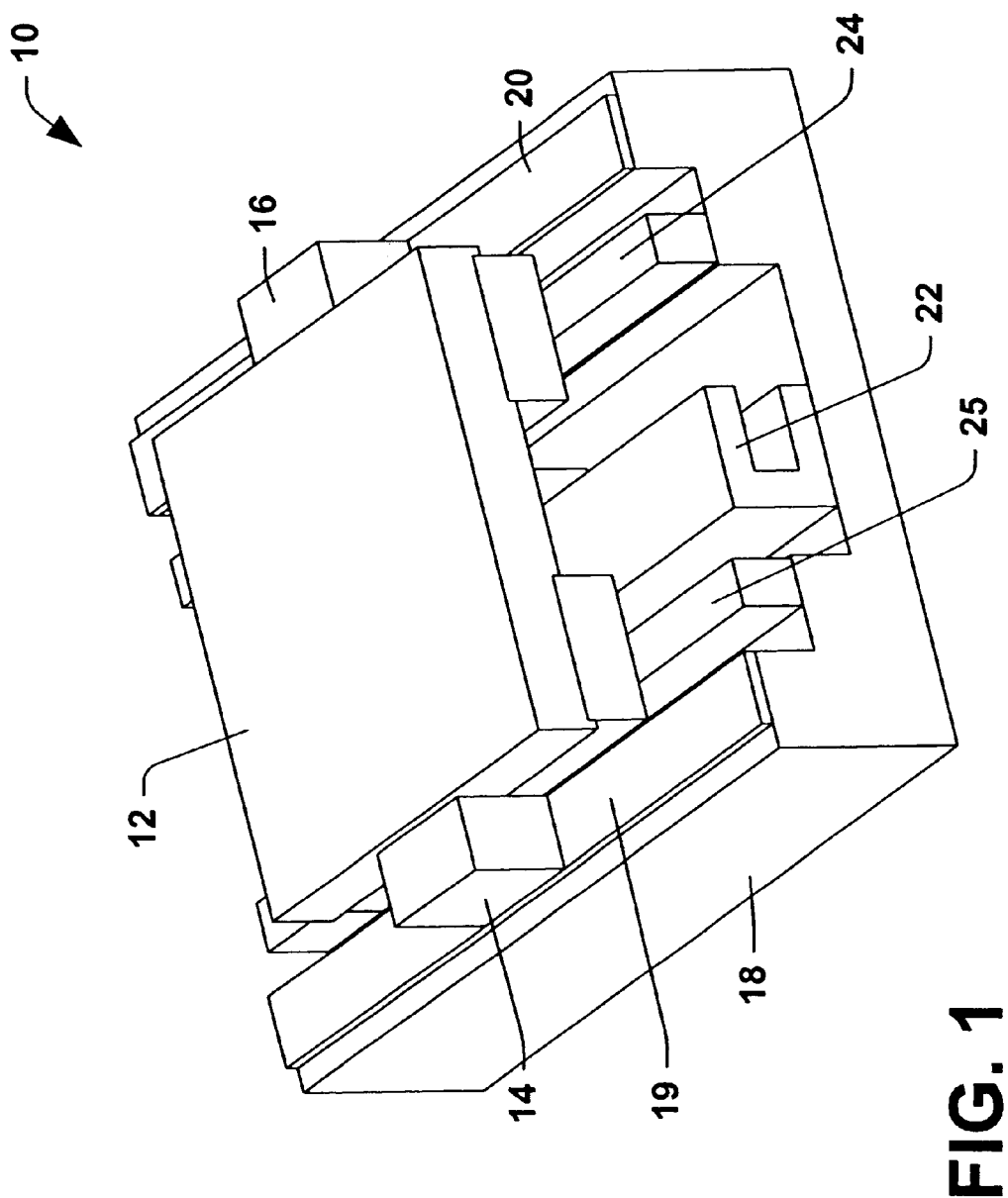
FIG. 1 illustrates a perspective view of a single axis motion system employing a high stability brake system in accordance with one aspect of the present invention.

FIG. 1 illustrates a linear motion system 10 having a high stability brake or stabilizer system in accordance with an aspect of the present invention. The linear motion system 10 includes a slide or stage 12 with a first stability brake or stabilizer 14 mounted at a first end and a second stability brake or stabilizer 16 mounted at a second end. The slide or stage 12 moves along a pair of rails 24 and 25 attached to a base 18. It is to be appreciated that only a portion of the base 18 is shown for illustrative purposes and the base 18 can be comprised of an entire path or track system on which the slide or stage 12 moves. A linear motor 22 disposed inside the base 18 generates a magnetic field to control the positioning, movement and stopping of the stage 12 along the base 18. The slide or stage 12 can include a plurality of magnets disposed therein. The magnetic field generated by the linear motor 22 causes the magnets in the stage 12 to move and stop at a desired position along the base 18. A controller (not shown) controls the excitation of the linear motor 22, which provides precise positioning of the slide or stage 12 along the rails 24 and 25.

The stage or slide 12 is moved to a work position with precision controlled by the linear motor 22 and the controller (not shown). However, noise in the system 10 such as ground noise, ambient noise and system noise cause small amounts of jittering or vibration of the stage 12. These types of jitter or vibration cannot be measured or compensated for by typical feedback elements (e.g., encoder) of the stage. Therefore, the present invention employs the first and second stability brake 14 and 16, which engage a first and second wear plate 19 and 20, respectively, upon moving to the work position. The stability brakes 14 and 16 allow for the stage 12 to hold position to an order of at least 5 nanometers.

In one type of linear motion system, the path or base 12 includes sets of winding, such as repeating phases of a multiphase armature. The windings are operative to receive corresponding phases of drive power produced by a motor controller. The stage 12 includes a plurality of motor magnets arranged, for example, in a generally linear array in a direction of travel. The magnets further are arranged so that adjacent magnets have alternating polarity so as to interact with the magnetic field generated by the windings, which can produce translational forces that effect desired relative movement between the stage and path. It is to be understood and appreciated that, alternatively, the windings could be implemented at the stage and the magnets could be arranged in the direction of travel along the path. It also is to be understood and appreciate that the stabilizer also could be implemented with respect multi-axis linear and/or rotary actuators in accordance with an aspect of the present invention.

The present invention also is applicable to other types of linear motor systems, such as a linear stepper motor as well as rotary motors. A linear stepper motor includes a forcer (or stage) having windings that are inserted into a laminated core assembly. The stepper also includes a stationary platen having a plurality of teeth spaced apart from each other in a direction of movement to define the path. The forcer moves by application of power to a winding, which generates force by causing teeth of the forcer to align with teeth of the platen. The change in current through the windings causes the teeth to consecutively align and, thus, create linear motion. There are various configurations of linear motors, including generally flat motors, U-channel and tubular shaped motors. Different types of linear motors also are available, including brush, AC brushless, stepper, and induction motors. Common to most linear motors are a moving assembly, usually called a forcer, which moves relative to a stationary platen according to magnetic fields generated by application of current through one or more associated windings. The windings can be on the forcer or at the platen depending on the type of motor.

It is to be appreciated that the example of FIG. 1 is one particular example of a motion system employing the high stability brake system in accordance with the present invention. The present invention is also applicable to mechanical bearing positioning systems, rotary positioning systems, air bearing positioning systems, ball-screw driven positioning systems and a variety of different linear motor driven positioning systems. The present invention is particularly suitable for semiconductor fabrication, such as deep Ultra-Violet (UV) metrology, electron beam metrology and basic metrology of semiconductor wafers. Although the present examples are illustrated with respect to a linear motion system, the high stability brake system of the present invention is applicable to a variety of different motion systems and stages (e.g., mechanical bearing stages, linear motor stages, rotary stages).

Figure 2:
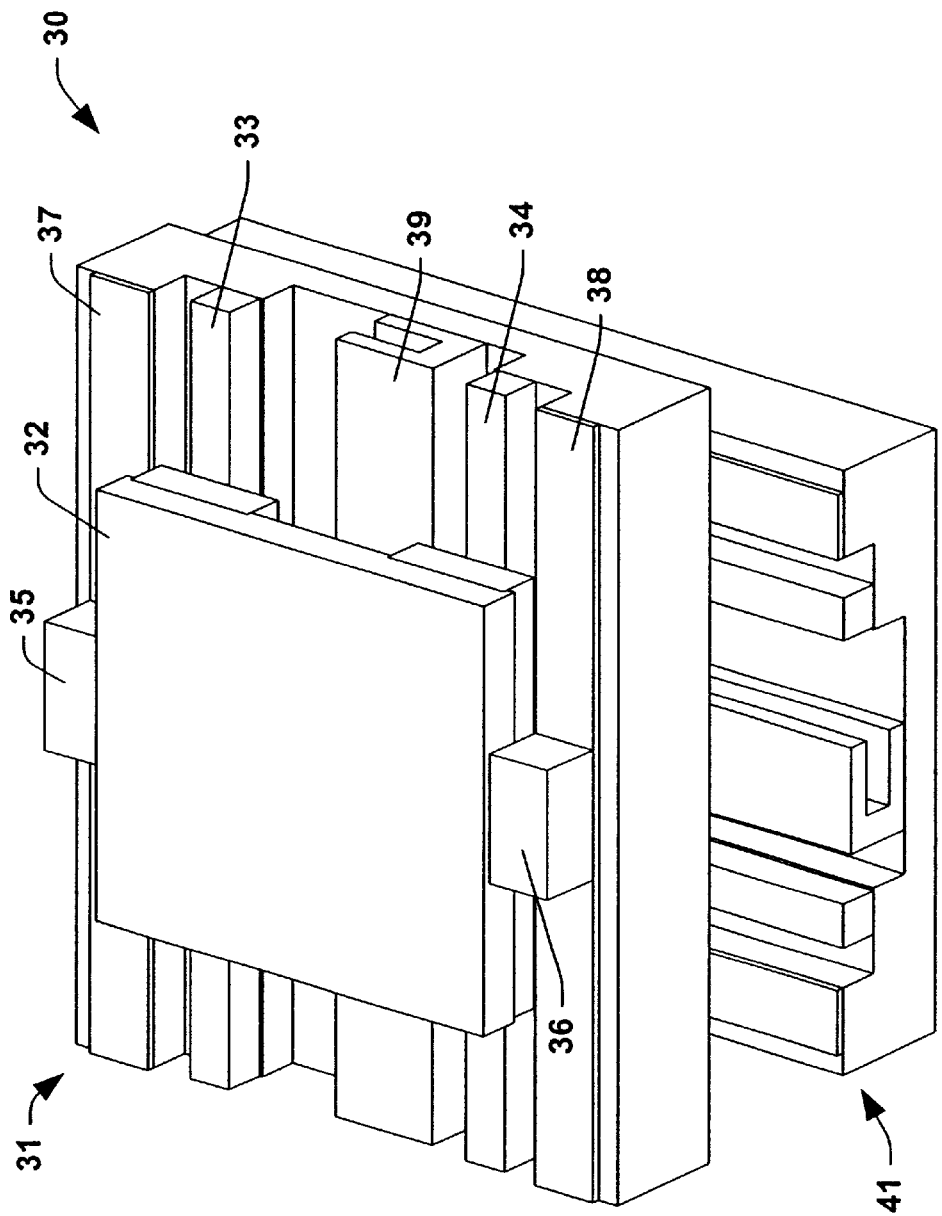
FIG. 2 illustrates a perspective view of a multi-axis motion system employing a high stability brake system in accordance with one aspect of the present invention.

Additionally, the present invention is applicable to multi-axis stage positioning systems. FIG. 2 illustrates a multi-axis stage positioning system 30 having a X-axis path system 31 disposed over a Z-axis path system 41. The X-axis path system 31 and the Z-axis path system 41 are both similar to the linear motion system 10 illustrated in FIG. 1. A stage 32 is illustrated on the X-axis path 31 moving along a pair of rails 33 and 34. The stage 32 includes a first stabilizer brake 35 on a first end and a second stabilizer brake 36 on a second end. The stage 32 moves to a working position on the X-axis path and the first stabilizer brake 35 and the second stabilizer brake 36 are enabled. The first and second stabilizer brakes 35 and 36 make contact with a first and a second wear plate 37 and 38, respectively, to compensate for jittering of the stage 32 when held in position under servo by a linear motor 39. The Z-axis path also includes a similar stage (not shown) with first and second stabilizer brakes that operate in a similar fashion of the first and second stabilizer brakes 35 and 36 of the X-axis path. Therefore, further discussion of such will be omitted for the sake of brevity. It is to be appreciated that the present invention is not limited to two-axis motion system but can be employed in any number of multiple axis systems (e.g., X-axis, Y-axis and Z-axis systems).

Figure 3:
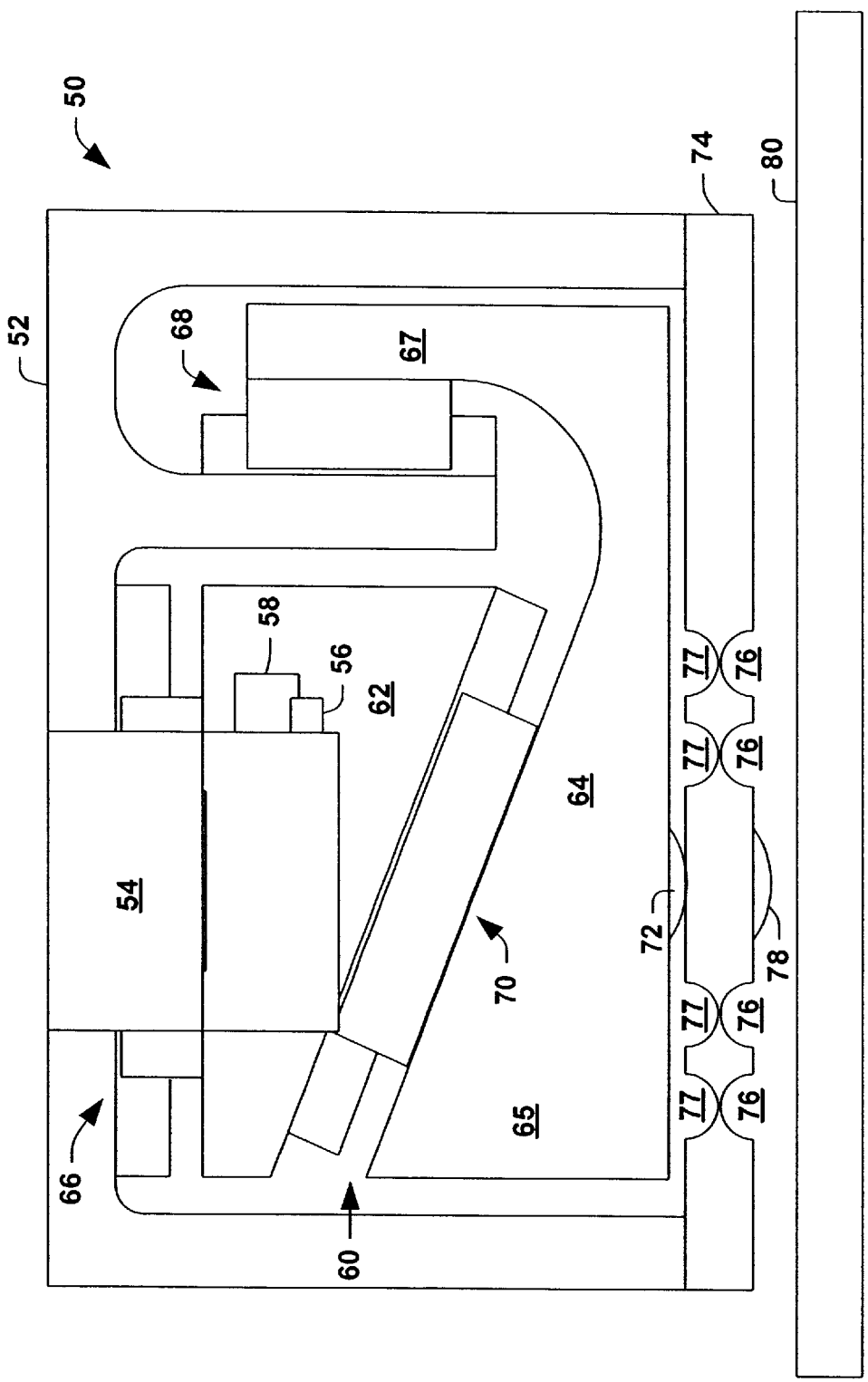
FIG. 3 illustrates a cross-sectional view of a stability brake in accordance with one aspect of the present invention.

FIG. 3 illustrates a cross-sectional view of an example of a stability brake 50 in accordance with one aspect of the present invention. The stability brake 50 includes a motor 54, a translation system 60 and a flexure plate 74 residing in a housing 52. The translation system 60 translates horizontal movement of the motor 54 into vertical movement of the flexure plate 74. Although the motor 54 is illustrated as being mounted horizontally, a vertically mounted motor configuration can be employed to carry out the present invention. The flexure plate 74 includes a contact protuberance or button 78 on a bottom surface of the flexure plate 74. The stability brake 50 has an enabled position in which the contact protuberance or button 78 of the flexure plate 74 makes contact with a wear plate 80. The stability brake.50 has a disabled position in which the contact protuberance or button 78 does not make contact with the wear plate 80.

The motor 54 controls the state of the stability brake 50 by moving between a first horizontal position and a second horizontal position. The motor 54 can be turned off after being moving the stability brake 50 to an enabled position. The translation system 60 translates the horizontal movement of the motor 54 into vertical movement of the flexure plate 74. The translation system 60 includes a first wedge portion 62 and a second wedge portion 64. The use of a motor driven stability brake along with a translation system with a first and second wedge portion gives a higher multiple ratio between movement of the motor and the contact protuberance or button. The angles of the first and second wedge portions can be selected to provide different translation ratios (e.g., 10:1, 5:1, 3:1, 2:1), such that movement of the motor 54 translates to movement of the contact protuberance or button 78 that is a multiple of the movement of the motor 54.

In one aspect of the invention, the motor 54 is a piezoceramic linear motor. A piezoceramic linear motor operates at frequencies much higher than the mechanical resonance of the stage and allows continuous smooth motion, while maintaining high resolution and position accuracy typical of piezoelectric devices. The motor 54 is connected to a strip 56 (e.g., a ceramic strip) by an attachment piece (not shown). The strip 56 is connected to a moving part 58. A first bearing assembly 66 is provided between the moving part 58 and the first wedge portion 62, while a second bearing assembly 70 is provided between the first wedge portion 62 and the second wedge portion 64. The first and second bearing assemblies 66 and 70 facilitate horizontal movement of the first wedge portion 62.

A vertical bearing assembly 68 is provided between the second wedge portion 64 and the housing 52. The vertical bearing assembly 68 facilitates vertical movement of the second wedge portion 64. The second wedge portion 64 has a wedge shaped portion 65 and a long vertical portion 67. The long vertical portion 67 is coupled to the vertical bearing assembly 68, while the wedge shaped portion 65 is coupled to the first wedge portion 62 through the second bearing assembly 70. The motor 54 moves the moving part 58 horizontally plane causing horizontal movement of the first wedge portion 62, which translates into vertical movement of the second wedge portion 64.

The motor 54 has a first position for enabling the stabilizer brake 50 and a second position for disabling the stabilizer brake 50. The motor 54 moves the strip 56 in a horizontal direction causing the moving part 58 to move in a horizontal direction. This causes the first wedge portion 62 to move along bearing assembly 66 causing downward force on the second wedge portion 64. The second wedge portion 64 then moves along second bearing assembly 70 and vertical bearing assembly 68 forcing a contact piece 72 into the flexure plate 74. The contact piece 72 is disposed between the second wedge portion 64 and the flexure plate 74. The flexure plate 74 then moves the contact protuberance or button 78 in contact with the wear plate 80 enabling the brake 50. The motor 54 can be turned off after being moving the stability brake 50 to an enabled position. The flexure plate 74 includes a plurality of top recesses 77 and a plurality of bottom recesses 76 that allow the flexure plate 74 to absorb jittering, vibration and other parasitic motions of the stage under servo. The flexure plate 74 can be formed of copper, steel or some other metal.

Figure 4:
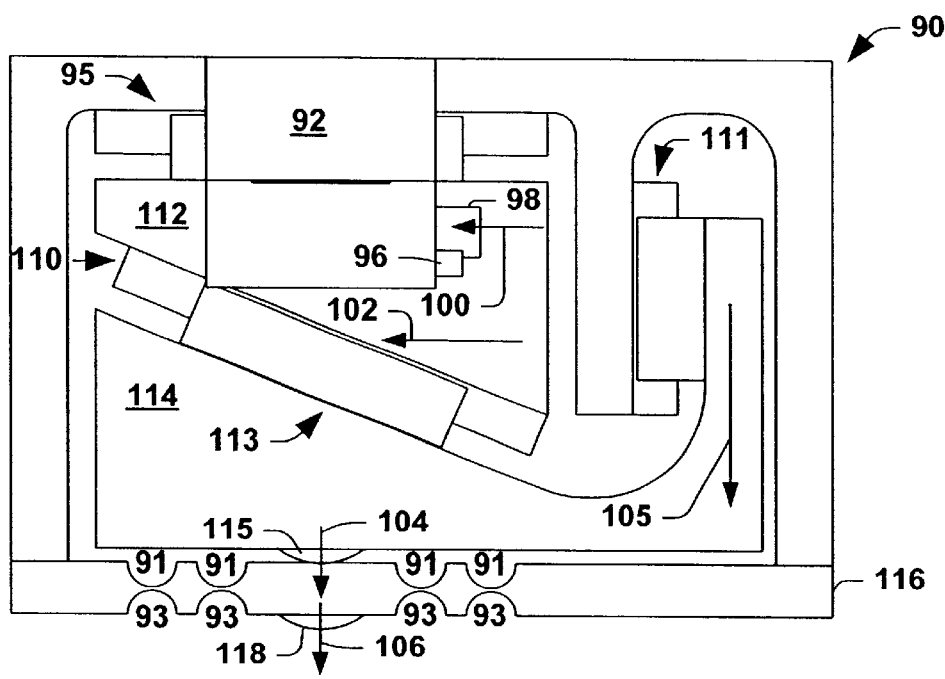
FIG. 4 illustrates a cross-sectional view of a stability brake moving from a disabled position to an enabled position in accordance with one aspect of the present invention.
Figure 5:
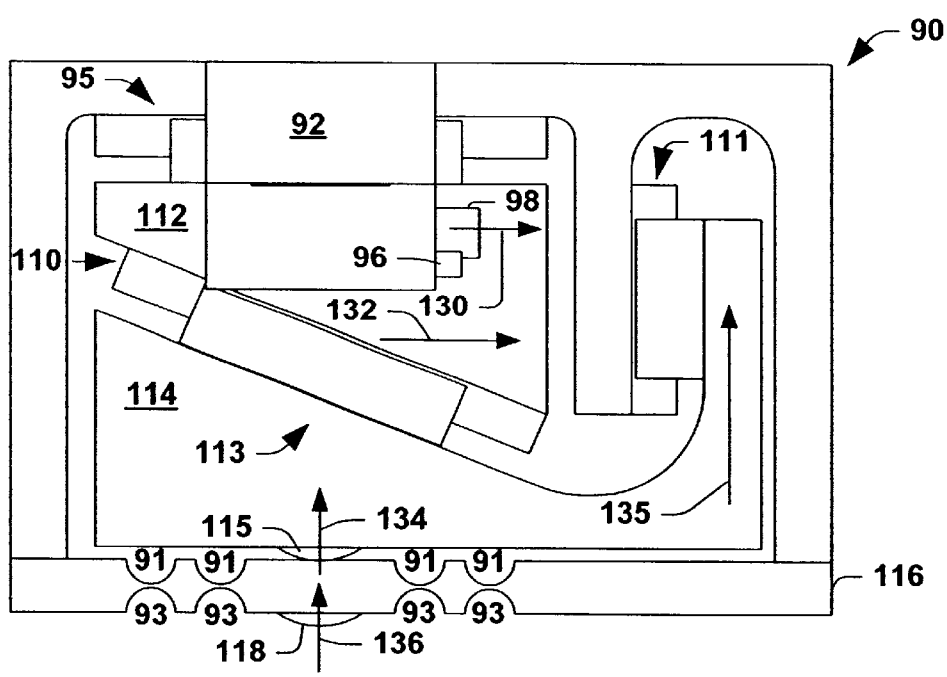
FIG. 5 illustrates a cross-sectional view of a stability brake moving from an enabled position to a disabled position in accordance with one aspect of the present invention.

FIGS. 4–5 illustrate movement of a stability brake 90 between an enabled position and a disabled position in accordance with an aspect of the present invention. The stability brake 90 includes a motor 92, a translation system 110 and a flexure plate 116. The translation system 110 translates horizontal movement of the motor 92 into vertical movement of the flexure plate 116. The flexure plate 116 includes a contact protuberance or button (e.g., spherical) 118 on a bottom surface of the flexure plate 116. The translation system 110 includes a first wedge portion 112 and a second wedge portion 114. The motor 92 is connected to a strip 96 by an attachment piece (not shown). The strip 96 is connected to a moving part 98. The moving part 98 is operatively coupled to the first wedge portion 112 and moves along a first bearing assembly 95. The first wedge portion 112 is operatively coupled to the second wedge portion 114 through a second bearing assembly 113, such that horizontal movement of the first wedge portion 112 causes vertical movement of the second wedge portion 114. The second wedge portion moves vertically along a vertical bearing assembly 111. A contact piece 115 is disposed between the second wedge portion 114 and the flexure plate 116, so that vertical movement of the contact piece 115 causes vertical movement of the flexure plate 116 and the contact protuberance or button 118.

The motor 92 controls the state of the stability brake 90 by moving between a first horizontal position and a second horizontal position. FIG. 4 illustrates movement of the stability brake from a disabled position to an enabled position. The motor 90 moves the strip 96 and, thus, moves the moving part 98 from a first position to a second position in the direction of arrows 100. The moving part 98 moves the first wedge portion 112 in the direction of arrow 102 causing downward force of the second wedge along arrow 104. The downward force pushes contact piece 115 against the flexure plate 116, which results in contact protuberance 118 being forced in the direction of arrow 106. The contact protuberance or button 118 makes contact with a braking surface (not shown). The flexure plate 116 includes a plurality of top recesses 91 and bottom recesses 93 which allows the flexure plate 116 to flex and absorb parasitic movement relating to jittering or vibration of the stage (not shown) and the braking surface (not shown).

FIG. 5 illustrates movement of the stability brake 90 from an enabled position to a disabled position. The motor 92 moves the strip 96 and, thus, the moving part 98 from the second position to the first position in the direction of arrow 130. The moving part 98 moves the first wedge portion 112 in the direction of arrow 132 allowing upward movement of the second wedge portion 114 along arrow 134. The contact protuberance 118 of the flexure plate 116 is moved upward in the direction of arrow 136 causing the contact piece 115 to move upward in the direction of arrow 134. The contact protuberance or button 118 is removed from making contact with the braking surface (not shown). The flexure plate 116 flexes back to its original position.

It is to be appreciated that the use of a motor driven stability brake along with a translation system with a first and second wedge portion gives a higher multiple ratio between movement of the motor and the contact protuberance. The angles of the first and second wedge portions can be selected to provide different translation ratios (e.g., 10:1, 5:1, 3:1, 2:1), such that movement of the strip 96 translates to movement of the contact protuberance or button that is a multiple of the movement of the strip. Therefore, precision of movement of the stability brake is improved.

Figure 6:
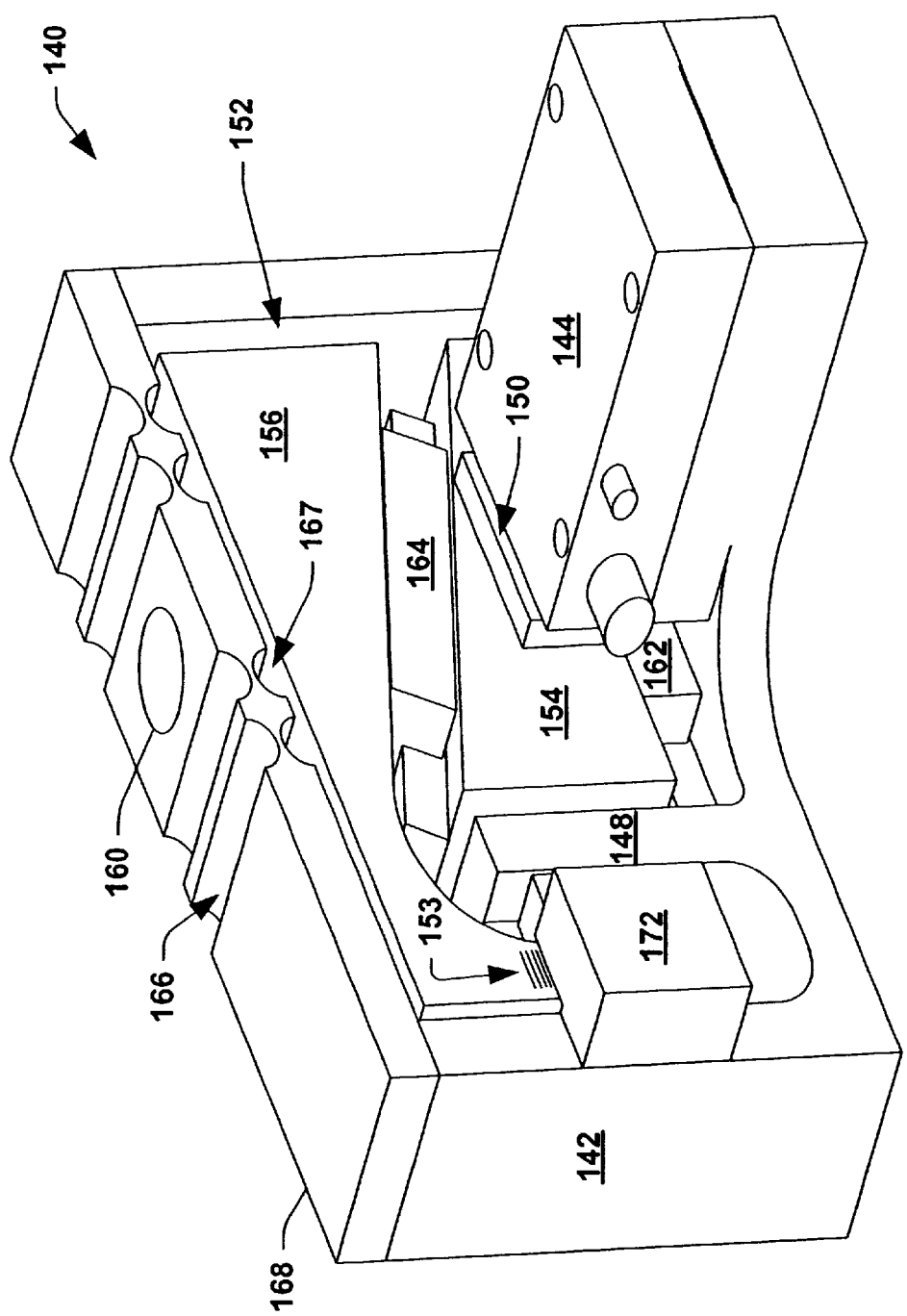
FIG. 6 illustrates a perspective view of a stability brake having an encoder in accordance with one aspect of the present invention.

FIG. 6 illustrates a bottom perspective view of a stability brake 140 employing an encoder 172 mounted to a translation system 152 for further improvement in precision of the stability brake 140. The stability brake 140 includes a motor 144, the translation system 152 and a flexure plate 168 residing in a housing 142. The translation system 152 translates horizontal movement of the motor 144 into vertical movement of the flexure plate 168. The flexure plate 168 includes a contact protuberance or button 160 on a bottom surface of the flexure plate 168. The stability brake 140 has an enabled position in which the contact protuberance or button 160 of the flexure plate 168 makes contact with a braking surface (not shown). The stability brake 140 has a disabled position in which the contact protuberance 160 does not make contact with a braking surface (not shown). The motor 144 controls the state of the stability brake 140 by moving between a first horizontal position and a second horizontal position. The translation system 152 translates the horizontal movement of the motor 144 into vertical movement of the flexure plate 168. The translation system 152 includes a first wedge portion 154 and a second wedge portion 156.

The motor 144 is connected to a (not shown) by an attachment piece (not shown). The strip is connected to a moving part 150. A bearing assembly is provided between the moving part 150 and the first wedge portion 154, while a bearing assembly 164 is provided between the first wedge portion 154 and the second wedge portion 156. A contact piece (not shown) is disposed between the second wedge portion 156 and the flexure plate 168. A vertical bearing assembly 148 is provided between the second wedge portion 156 and the housing 142. An encoder 172 is connected to the second wedge portion 156. The encoder 172 measures positioning information of the second wedge portion 156 using a scale or tape 153 having a plurality of markings. The scale 153 resides on a vertical portion of the second wedge portion 156. In one aspect of the invention, the scale 153 is a ¼-inch wide metal tape piece. The encoder 172 is electrically coupled to the motor 144 and provides the motor 144 with positioning information so that the motor can provide absolute positioning of the motor 144, strip 146, moving part 150 and first wedge portion 154.

The motor 144 has a first position for enabling the stabilizer brake 140 and a second position for disabling the stabilizer brake 140. The motor 140 illustrated in FIG. 6 is a two finger motor type, however, it is to be appreciated that other motor types can be employed to carry out the present invention. The motor 144 moves the strip in a horizontal direction causing the moving part 150 to move in a horizontal direction. This causes the first wedge portion 154 to move along bearings 162 causing downward force on the second wedge portion 156. The second wedge portion 156 then moves along bearings 164 and vertical bearings 148 forcing the flexure plate 168 vertically by the contact piece. The flexure plate 168 then moves the contact protuberance or button 160 in contact with a braking surface enabling the brake 140. The flexure plate 168 includes a plurality of recesses 166 and 167 that allow the flexure plate 168 to absorb jittering, vibration and other parasitic motions of the stage (not shown) under servo. The encoder 172 measures positioning information of the second wedge portion 156 and provides this information to the motor 144, so that the motor can make appropriate positioning adjustments.

Figure 7:
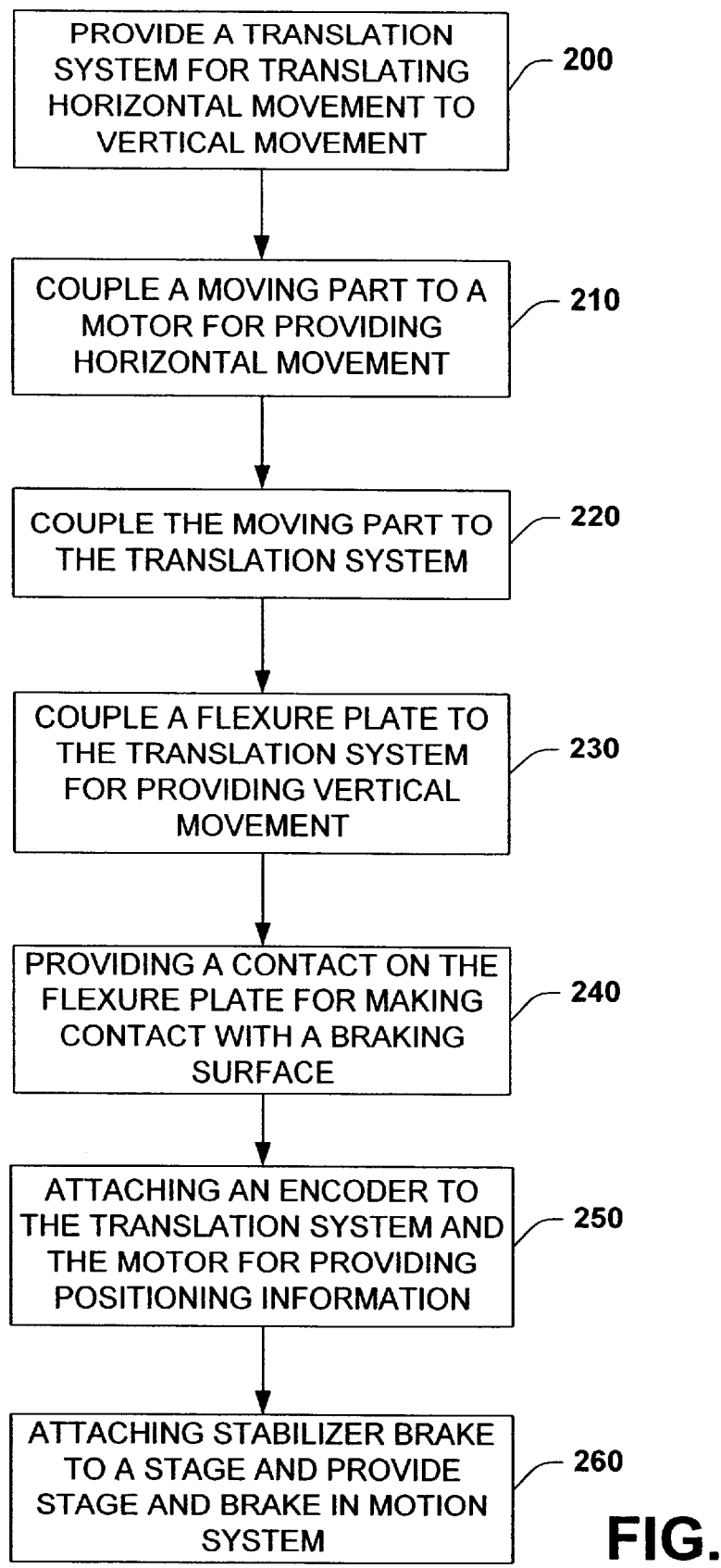
FIG. 7 illustrates a flow diagram of a methodology for providing a stability brake in accordance with one aspect of the present invention.
Figure 8:
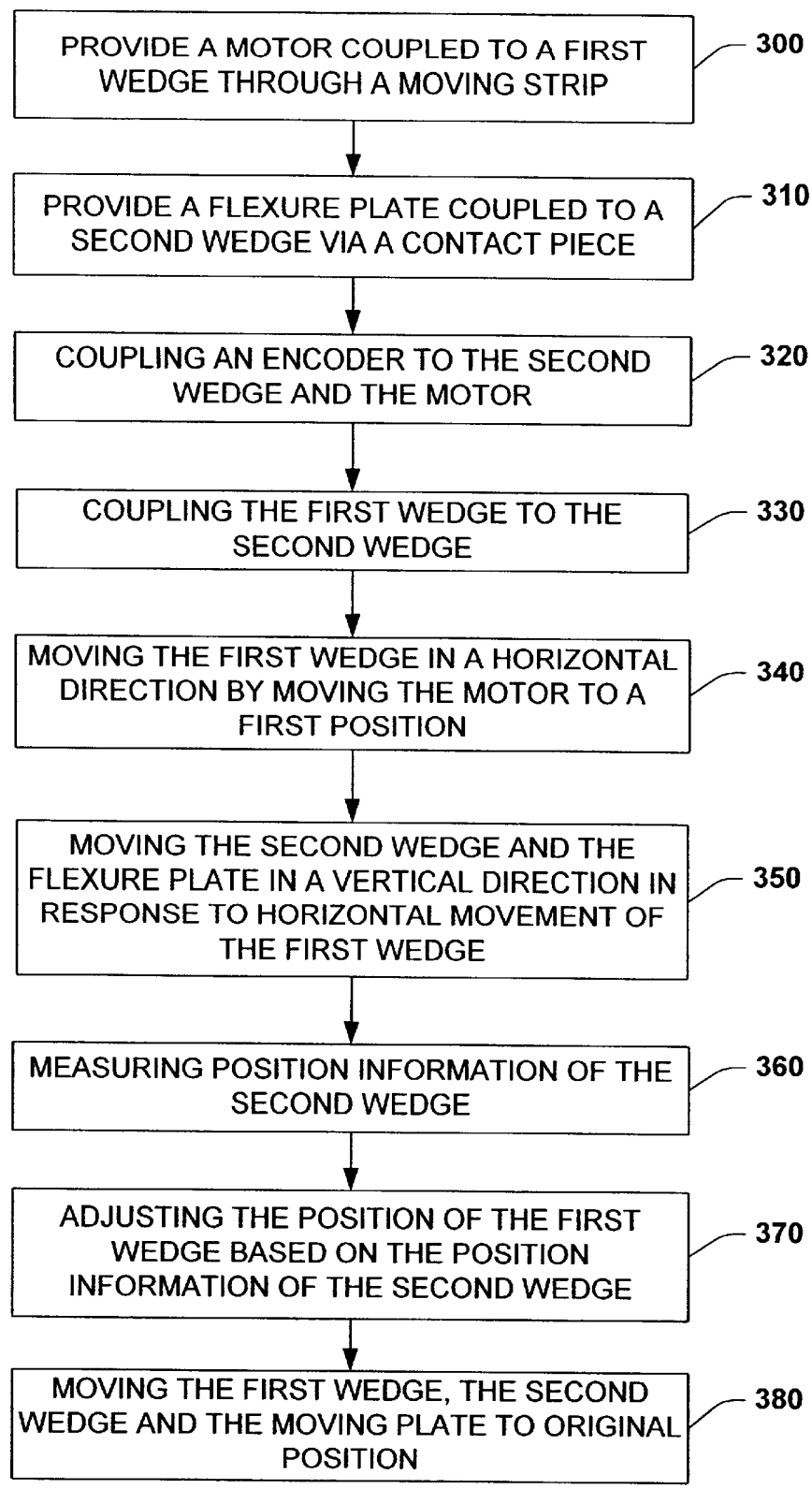
FIG. 8 illustrates a flow diagram of a methodology for providing and using a stability brake with an encoder in accordance with one aspect of the present invention.

In view of the foregoing structural and functional features described above, methodologies in accordance with various aspects of the present invention will be better appreciated with reference to FIGS. 7–8. While, for purposes of simplicity of explanation, the methodologies of FIGS. 7–8 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates one particular methodology for providing a stability brake in accordance with one particular aspect of the present invention. The methodology begins at 200 with providing a translation system for translating horizontal movement to vertical movement. For example, the translation system can be comprised of a first and second wedge portion to provide a translation ratio based on the angle of the first and second wedge portion. At 210, a moving part is coupled to a motor for providing horizontal movement. The moving part can be coupled directly to the motor or through a strip. The motor can be a piezoceramic linear motor and the strip can be a ceramic strip, such that precision can be provided in the nanometers. At 220, the moving part is coupled to the translation system through a bearing assembly or the like.

At 230, a flexure plate is then coupled to a translation system for providing vertical movement of the stability brake. The flexure plate is operative to absorb vibration, jittering and other noise associated with a stage of a motion system. The flexure plate can be provided with one or more recesses to allow the flexure plate to absorb parasitic motion associated with vibrations of a stage under servo. At 240, a contact is provided on the flexure plate for making contact with a braking surface. The contact can be spherically shaped. An encoder is then mechanically attached to the translation system and electrically attached to the motor for providing positioning information relative to the flexure plate to the motor at 250. The encoder can use a scale such as a mechanical tape with markings to measure positioning information relative to vertical movement of the flexure plate. At 260, the stability brake is attached to a stage and the stage provided in a motion system.

FIG. 8 illustrates one particular methodology for stabilizing a stage using a stability brake in accordance with one particular aspect of the present invention. The methodology begins at 300 with providing a motor coupled to a first wedge portion through a moving strip. At 310, a flexure plate is coupled to a second wedge portion via a contact piece. The angles of the first and second wedge portions can be selected to provide different translation ratios (e.g., 10:1, 5:1, 3:1, 2:1), such that movement of the motor translates to movement of the flexure plate that is a multiple of the movement of the motor. The flexure plate is operative to absorb jittering, vibration and other parasitic motions of a stage under servo. At 320, an encoder is mechanically coupled to the second wedge and electrically connected to the motor. The first wedge is then coupled to the second wedge via bearings or the like at 330.

At 340, the first wedge is moved in a horizontal direction by moving the motor to a first position. At 350, the second wedge and the flexure plate move in a vertical direction in response to horizontal movement of the first wedge. At 360, position information of the second wedge is measured and provided to the motor. The motor then adjusts the position of the first wedge based on the position information of the second wedge at 370. At 380, the first wedge, the second wedge and the moving plate are moved to their original position by moving the motor to a second position.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A linear motion system comprising:
   a stage operative to move along path to a working position; and
   a stability brake mounted to the stage, the stability brake having a motor coupled to a flexure plate through a translation system, the translation system translates horizontal movement of the motor to vertical movement of the flexure plate, such that the flexure plate makes contact with a surface of the path to absorb vibration of the stage in the working position.

2. The system of claim 1, the linear motion system being a single axis system.

3. The system of claim 1, the linear motion system being a multi-axis system.

4. The system of claim 1, the stability brake being mounted to a first end of the stage and a second stability brake being mounted to a second end of the stage.

5. The system of claim 1, the translation system comprising a first wedge portion coupled to the motor and a second wedge portion coupled to the flexure plate, such that horizontal movement of the first wedge portion causes vertical movement of the second wedge portion and the flexure plate.

6. The system of claim 5, the first wedge portion and the second wedge portion having an angle that is selected to provide a translation ratio that is the vertical movement of the flexure plate over the horizontal movement of the motor.

7. The system of claim 6, the translation ration being one of 10:1, 5:1, 3:1 and 2:1.

8. The system of claim 1, the flexure plate having a plurality of recesses for allowing the flexure plate to absorb vibration of the stage in the working position.

9. The system of claim 1, the flexure plate having a contact protuberance on the surface of the flexure plate, the contact protuberance operative to make contact with a surface of the path to absorb vibration of the stage in the working position.

10. The system of claim 1, further comprising an encoder mounted to the translation system, the encoder determines the vertical movement of the flexure plate and provides adjustment information to the motor.

11. A stability brake for absorbing parasitic motion of a stage held in a working position on a motion system, the stability brake comprising:
    a motor;
    a flexure plate operative to make contact with a surface of motion system to absorb vibration of a stage in the working position; and
    a translation system that translates horizontal movement of the motor into vertical movement of the flexure plate.

12. The stability brake of claim 11, the translation system comprising a first wedge portion coupled to the motor and a second wedge portion coupled to the flexure plate, such that horizontal movement of the first wedge portion causes vertical movement of the second wedge portion and the flexure plate.

13. The stability brake of claim 12, the first wedge portion and the second wedge portion having an angle that is selected to provide a translation ratio, the translation ratio being the vertical movement of the flexure plate over the horizontal movement of the motor.

14. The stability brake of claim 13, the translation ration being one of 10:1, 5:1, 3:1 and 2:1.

15. The stability brake of claim 12, the second wedge portion having a wedge shaped portion and a long vertical portion, the long vertical portion moving vertically along a vertical bearing assembly.

16. The stability brake of claim 15, further comprising an encoder mounted to the long vertical portion, the encoder determines the vertical movement of the long vertical portion and provides adjustment information to the motor.

17. The stability brake of claim 16, further comprising a scale provided on the long vertical portion, the scale having a plurality of markings used by the encoder to determine the vertical movement of the long vertical portion.

18. The stability brake of claim 11, the flexure plate having a plurality of recesses for allowing the flexure plate to absorb vibration of the stage in the working position.

19. The stability brake of claim 11, the flexure plate having a contact protuberance on the surface of the flexure plate, the contact protuberance being operative to make contact with a surface of a path to absorb vibration of a stage in a working position.

20. The stability brake of claim 11, the motor being a piezoceramic linear motor.

21. A method for providing a stability brake for absorbing parasitic motion of a stage held in a working position on a motion system, the method comprising:
    providing a translation system that translates horizontal movement into vertical movement;
    coupling a motor to the translation system for providing horizontal movement; and
    coupling a flexure plate to the translation system, the flexure plate operative to absorb parasitic motion of a stage held in a working position.

22. The method of claim 21, further comprising providing the flexure plate with a contact protuberance operative to make contact with a surface of the motion system.

23. The method of claim 21, further comprising providing the flexure plate with a plurality of recesses that allow the flexure plate to absorb parasitic motion.

24. The method of claim 21, the translation system comprising a first wedge portion coupled to the motor and a second wedge portion coupled to the flexure plate, such that horizontal movement of the first wedge portion causes vertical movement of the second wedge portion and the flexure plate.

25. The method of claim 21, further comprising attaching an encoder to the translation system, the encoder determining the vertical movement of the flexure plate and providing adjustment information to the motor.

26. A stability brake for absorbing parasitic motion of a stage held in a working position on a motion system, the stability brake comprising:
    means for absorbing vibration of a stage in a working position;
    means for providing horizontal movement;
    means for translating the horizontal movement into vertical movement of the means for absorbing vibration of a stage in the working position, such that horizontal movement between a first position and a second position moves the stability brake between a disabled position and an enabled position.

27. The system of claim 26, further comprising means for determining the vertical movement of the means for absorbing vibration of a stage in a working position.

* * * * *